(12) United States Patent
Raviv

(10) Patent No.: US 12,177,315 B2
(45) Date of Patent: Dec. 24, 2024

(54) MARINE DATA COLLECTION FOR MARINE ARTIFICIAL INTELLIGENCE SYSTEMS

(71) Applicant: ORCA AI LTD., Tel Aviv (IL)

(72) Inventor: Dor Raviv, Tel Aviv (IL)

(73) Assignee: ORCA AI LTD., Tel Aviv (IL)

( * ) Notice: Subject to any disclaimer, the term of this patent is extended or adjusted under 35 U.S.C. 154(b) by 382 days.

(21) Appl. No.: 17/602,130

(22) PCT Filed: Apr. 7, 2020

(86) PCT No.: PCT/IL2020/050420
§ 371 (c)(1),
(2) Date: Oct. 7, 2021

(87) PCT Pub. No.: WO2020/212973
PCT Pub. Date: Oct. 22, 2020

(65) Prior Publication Data
US 2022/0144392 A1    May 12, 2022

Related U.S. Application Data

(60) Provisional application No. 62/835,517, filed on Apr. 18, 2019.

(51) Int. Cl.
*H04L 67/61* (2022.01)
*B63B 79/00* (2020.01)
(Continued)

(52) U.S. Cl.
CPC .............. *H04L 67/61* (2022.05); *B63B 79/00* (2020.01); *G06N 3/08* (2013.01); *G06N 20/20* (2019.01)

(58) Field of Classification Search
CPC ........... H04L 67/61; B63B 79/00; G06N 3/08; G06N 20/20
See application file for complete search history.

(56) References Cited

U.S. PATENT DOCUMENTS

| 8,086,736 B2 | 12/2011 | Omino et al. |
| 2007/0185646 A1* | 8/2007 | Neugebauer ........... G07C 5/008 701/533 |

(Continued)

FOREIGN PATENT DOCUMENTS

| CN | 201514701 U | 6/2010 |
| CN | 106599995 B | 4/2019 |

(Continued)

OTHER PUBLICATIONS

Susanto et al., "Machine Learning for Data Processing in Vessel Telemetry System: Initial Study" 2019 International Conference of Artificial Intelligence and Information Technology (ICAIIT), Mar. 2019 (Year: 2019).*

(Continued)

*Primary Examiner* — John C Kuan
(74) *Attorney, Agent, or Firm* — Dorsey & Whitney LLP

(57) ABSTRACT

A method comprising, by at least one processing unit, obtaining data collected by one or more sensors of at least one marine vessel, said data being representative of one or more situations encountered by the marine vessel during its voyage, prioritizing data according to at least one relevance criterion, wherein when the marine vessel is located in a zone in which at least one remote data communication link meets a criterion, transmitting at least some of the data using the at least one remote data communication link, wherein data are transmitted according to priority determined for the data, thereby facilitating transmission of relevant data for the purpose of training one or more machine learning algorithms (e.g. deep learning algorithms) providing output based on these data.

20 Claims, 8 Drawing Sheets

(51) Int. Cl.
    *G06N 3/08*         (2023.01)
    *G06N 20/20*       (2019.01)

(56) References Cited

U.S. PATENT DOCUMENTS

| | | | |
|---|---|---|---|
| 2008/0291918 A1* | 11/2008 | Turcot | H04Q 3/0087 |
| | | | 370/395.3 |
| 2012/0307720 A1 | 12/2012 | Madsen et al. | |
| 2014/0086191 A1 | 3/2014 | Berntsen et al. | |
| 2017/0250751 A1 | 8/2017 | Kargieman et al. | |
| 2018/0261020 A1* | 9/2018 | Petousis | G07C 5/0841 |
| 2020/0255102 A1* | 8/2020 | Brunier | B63B 79/40 |

FOREIGN PATENT DOCUMENTS

| | | |
|---|---|---|
| EP | 3291206 A1 | 3/2018 |
| KR | 20100099833 A | 9/2010 |
| KR | 101284850 B1 | 7/2013 |
| KR | 101874361 B1 | 7/2018 |
| WO | 2009074655 A1 | 6/2009 |

OTHER PUBLICATIONS

Czarnowski, "Distributed Learning with Data Reduction" Transactions on CCI IV, LNCS 6660, pp. 3-121, 2011 (Year: 2011).*

* cited by examiner

MARINE DATA COLLECTION FOR MARINE ARTIFICIAL INTELLIGENCE SYSTEMS

TECHNICAL FIELD

The presently disclosed subject matter relates to the field of marine environment.

BACKGROUND

In the marine environment, a marine vessel travels on a route on which it can encounter various situations. Some of these situations can comprise a danger, e.g. an obstacle to be avoided, zones with dangerous weather, etc.

It is now necessary to provide new methods and systems in order to improve safety and reliability of marine vessels navigation.

GENERAL DESCRIPTION

In accordance with certain aspects of the presently disclosed subject matter, there is provided method comprising, by at least one processing unit, obtaining data collected by one or more sensors of at least one marine vessel, said data being representative of one or more situations encountered by the marine vessel during its voyage, prioritizing data according to at least one relevance criterion, when the marine vessel is located in a zone in which at least one remote data communication link meets a criterion, transmitting at least some of the data using the at least one remote data communication link, wherein data are transmitted according to priority determined for the data, thereby facilitating transmission of relevant data for the purpose of training one or more machine learning algorithms providing output based on these data.

In addition to the above features, the method according to this aspect of the presently disclosed subject matter can optionally comprise one or more of features (i) to (ix) below, in any technically possible combination or permutation:

i. the relevance criterion reflects a relevance of the data for training one or more machine learning algorithms based on these data;

ii. prioritizing data according to the at least one relevance criterion depends on one or more actions taken by at least one of a crew and an auto-pilot of the marine vessel for controlling the marine vessel;

iii. prioritizing data according to the at least one relevance criterion is based on at least a monitoring of data representative of at least one of the route and of inertial data of the marine vessel;

iv. when the marine vessel enters a zone in which remote data communication using at least one broadband cellular network meets a criterion, the method comprises transmitting at least some of the data over the broadband cellular network, wherein data are transmitted according to the priority assigned to the data;

v. the method comprises selecting a fraction of the obtained data for storing said fraction of obtained data before their transmission, wherein, for each period of time of a plurality of periods of time, a selection of the fraction of obtained data relative to the obtained data depends on priority assigned to obtained data associated with said period of time;

vi. the marine vessel embeds a system comprising a machine learning algorithm attempting to provide output representative of actual situation encountered by the marine vessel during its voyage based at least on data collected by said one or more sensors, and the method comprises prioritizing data according to the least one relevance criterion depends on a matching between the actual situation and the output provided by the system according to a matching criterion;

vii. the lower the matching between the actual situation and the output provided by the system, the higher the priority assigned to collected data representative of said actual situation;

viii. the lower the matching between the actual situation and the output provided by the system, the higher the priority assigned to collected data representative of said actual situation;

ix. the method comprises training at least one machine learning algorithm based on transmitted data.

According to another aspect of the presently disclosed subject matter there is provided a method comprising, by at least one processing unit, obtaining data collected by one or more sensors mounted on at least one marine vessel, said data being representative of one or more situations encountered by the marine vessel during its voyage, determining relevance of obtained data according to at least one relevance criterion, storing in a memory a fraction of the obtained data, wherein selection of the fraction of the obtained data relative to the obtained data depends on a relevance determined for the obtained data, when the marine vessel is located in a zone in which at least one remote data communication link meets a criterion, transmitting at least some of the stored data using the at least one remote communication link, thereby facilitating transmission of relevant data for the purpose of training one or more machine learning algorithms providing output based on these data.

In addition to the above features, the method according to this aspect of the presently disclosed subject matter can optionally comprise features (x) below (and features (i) to (ix) above), in any technically possible combination or permutation:

x. when the marine vessel is located in a zone in which at least one remote data communication link meets a criterion, the method comprises transmitting at least part of the stored data using the at least one remote data communication link, wherein data are transmitted according to relevance determined for the data, thereby facilitating transmission of relevant data for the purpose of training one or more machine learning algorithms providing output based on these data;

According to another aspect of the presently disclosed subject matter there is provided a system comprising at least one processing unit configured to obtain data collected by one or more sensors of at least one marine vessel, said data being representative of one or more situations encountered by the marine vessel during its voyage, prioritize data according to at least one relevance criterion, when the marine vessel is located in a zone in which at least one remote data communication link meets a criterion, trigger transmission of at least some of the data using the at least one remote data communication link, wherein data are transmitted according to priority determined for the data, thereby facilitating transmission of relevant data for the purpose of training one or more machine learning algorithms providing output based on these data.

In addition to the above features, the system according to this aspect of the presently disclosed subject matter can optionally comprise features (xi) to (xix) below, in any technically possible combination or permutation:

xi. the relevance criterion reflects a relevance of the data for training one or more machine learning algorithms based on these data;

xii. prioritizing data according to the at least one relevance criterion depends on one or more actions taken by at least one of a crew and an auto-pilot of the marine vessel for controlling the marine vessel;

xiii. prioritizing data according to the at least one relevance criterion is based on at least a monitoring of data representative of at least one of the route and of inertial data of the marine vessel;

xiv. when the marine vessel enters a zone in which remote data communication using at least one broadband cellular network meets a criterion, the system is configured to trigger transmission of at least some of the data over the broadband cellular network, wherein data are transmitted according to the priority assigned to the data;

xv. the system is configured to select a fraction of the obtained data for storing said fraction of obtained data before their transmission, wherein, for each period of time of a plurality of periods of time, selection of the fraction of obtained data relative to the obtained data depends on priority assigned to obtained data associated with said period of time;

xvi. the marine vessel embeds a second system comprising a machine learning algorithm attempting to provide output representative of actual situation encountered by the marine vessel during its voyage based at least on data collected by said one or more sensors, and the system is configured to prioritize data according to the least one relevance criterion depending on a matching between the actual situation and the output provided by the system according to a matching criterion;

xvii. the lower the matching between the actual situation and the output provided by the second system, the higher the priority assigned to collected data representative of said actual situation;

xviii. prioritizing data according to the least one relevance criterion for a specific sensor relative to data collected by other sensors depends on a matching between the actual situation and the output provided by the second system for this specific sensor according to a matching criterion;

xix. relevance of data defined by the relevance criterion depends on an output of a plurality of different sensors of the marine vessel.

According to another aspect of the presently disclosed subject matter there is provided a system comprising at least one processing unit configured to obtain data collected by one or more sensors mounted on at least one marine vessel, said data being representative of one or more situations encountered by the marine vessel during its voyage, determine relevance of obtained data according to at least one relevance criterion, store in a memory a fraction of the obtained data, wherein selection of the fraction of the obtained data relative to the obtained data depends on a relevance determined for the obtained data, and when the marine vessel is located in a zone in which at least one remote data communication link meets a criterion, trigger transmission of at least part of the stored data using the at least one remote communication link, thereby facilitating transmission of relevant data for the purpose of training one or more machine learning algorithms providing output based on these data.

In addition to the above features, the system according to this aspect of the presently disclosed subject matter can optionally comprise features (xx) below (and features (ix) to (xix) above), in any technically possible combination or permutation:

xx. when the marine vessel is located in a zone in which at least one remote data communication link meets a criterion, the system is configured to trigger transmission of at least some of the stored data using the at least one remote data communication link, wherein data are transmitted according to relevance determined for the data, thereby facilitating transmission of relevant data for the purpose of training one or more machine learning algorithms providing output based on these data.

According to another aspect of the presently disclosed subject matter there is provided a non-transitory storage device readable by a machine, tangibly embodying a program of instructions executable by the machine to perform a method of obtaining data collected by one or more sensors of at least one marine vessel, said data being representative of one or more situations encountered by the marine vessel during its voyage, prioritizing data according to at least one relevance criterion, when the marine vessel is located in a zone in which at least one remote data communication link meets a criterion, triggering transmission of at least part of the data using the at least one remote data communication link, wherein data are transmitted according to priority determined for the data, thereby facilitating transmission of relevant data for the purpose of training one or more machine learning algorithms providing output based on these data.

In addition to the above features, the method according to this aspect of the presently disclosed subject matter can optionally comprise one or more of features (i) to (ix) above, in any technically possible combination or permutation:

According to another aspect of the presently disclosed subject matter there is provided a non-transitory storage device readable by a machine, tangibly embodying a program of instructions executable by the machine to perform a method of obtaining data collected by one or more sensors mounted on at least one marine vessel, said data being representative of one or more situations encountered by the marine vessel during its voyage, determining relevance of obtained data according to at least one relevance criterion, storing in a memory a fraction of the obtained data, wherein selection of the fraction of the obtained data relative to the obtained data depends on a relevance determined for the obtained data, and when the marine vessel is located in a zone in which at least one remote data communication link meets a criterion, triggering transmission of at least some of the stored data using the at least one remote communication link, thereby facilitating transmission of relevant data for the purpose of training one or more machine learning algorithms providing output based on these data.

In addition to the above features, the method according to this aspect of the presently disclosed subject matter can optionally comprise features (i) to (x) above, in any technically possible combination or permutation:

According to some embodiments, the proposed solution allows collecting relevant data representative of situations encountered by marine vessels, in order to train one or more machine learning algorithms (which can include e.g. one or more deep learning algorithms) providing output (e.g. prediction, detection, analysis, etc.) based on these data.

According to some embodiments, the proposed solution allows collecting large amount of relevant data representative of situations encountered by marine vessels, and remotely transmitting these data, although remote communication in the marine environment is challenging (e.g. in terms of coverage, quality of communication, latency, connectivity, cost, etc.).

According to some embodiments, the proposed solution allows collecting and transmitting large amount of relevant data representative of situations encountered by marine vessels in a more efficient way, which optimizes processing resources and cost.

According to some embodiments, the proposed solution is tailored for the marine environment and splits processing of data and transmission of data over time. It takes advantage of the specificity of a voyage of a marine vessel. In particular, processing of data is mainly performed while the marine vessel is travelling in zones in which remote data communication is not possible or not efficient, therefore allowing immediate remote transmission of data when remote data communication becomes possible.

According to some embodiments, the proposed solution allows selecting in an adaptive way data collected by sensors of the marine vessel over time, based on their relevance, thereby optimizing storage, processing resources, labeling effort, supervising incoming data and bandwidth required for transmitting data.

According to some embodiments, the proposed solution allows up-to-date and online assessment of relevance of collected data for training one or more machine learning algorithms (which can include e.g. one or more deep learning algorithms) in the marine environment.

According to some embodiments, the proposed solution is critical for training of machine leaning algorithms (which can include e.g. one or more deep learning algorithms) providing output in the marine environment. As a consequence, it is useful for improving safety and reliability of marine vessels.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "obtaining", "prioritizing", "selecting", "monitoring", "training", "storing" or the like, refer to the action(s) and/or process(es) of a processing unit that manipulate and/or transform data into other data, said data represented as physical, such as electronic, quantities and/or said data representing the physical objects.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single processor or multiple processors, which may be located in the same geographical zone or may, at least partially, be located in different zones and may be able to communicate together.

The term "non-transitory memory" as used herein should be expansively construed to cover any volatile or non-volatile computer memory suitable to the presently disclosed subject matter.

Figure 1:
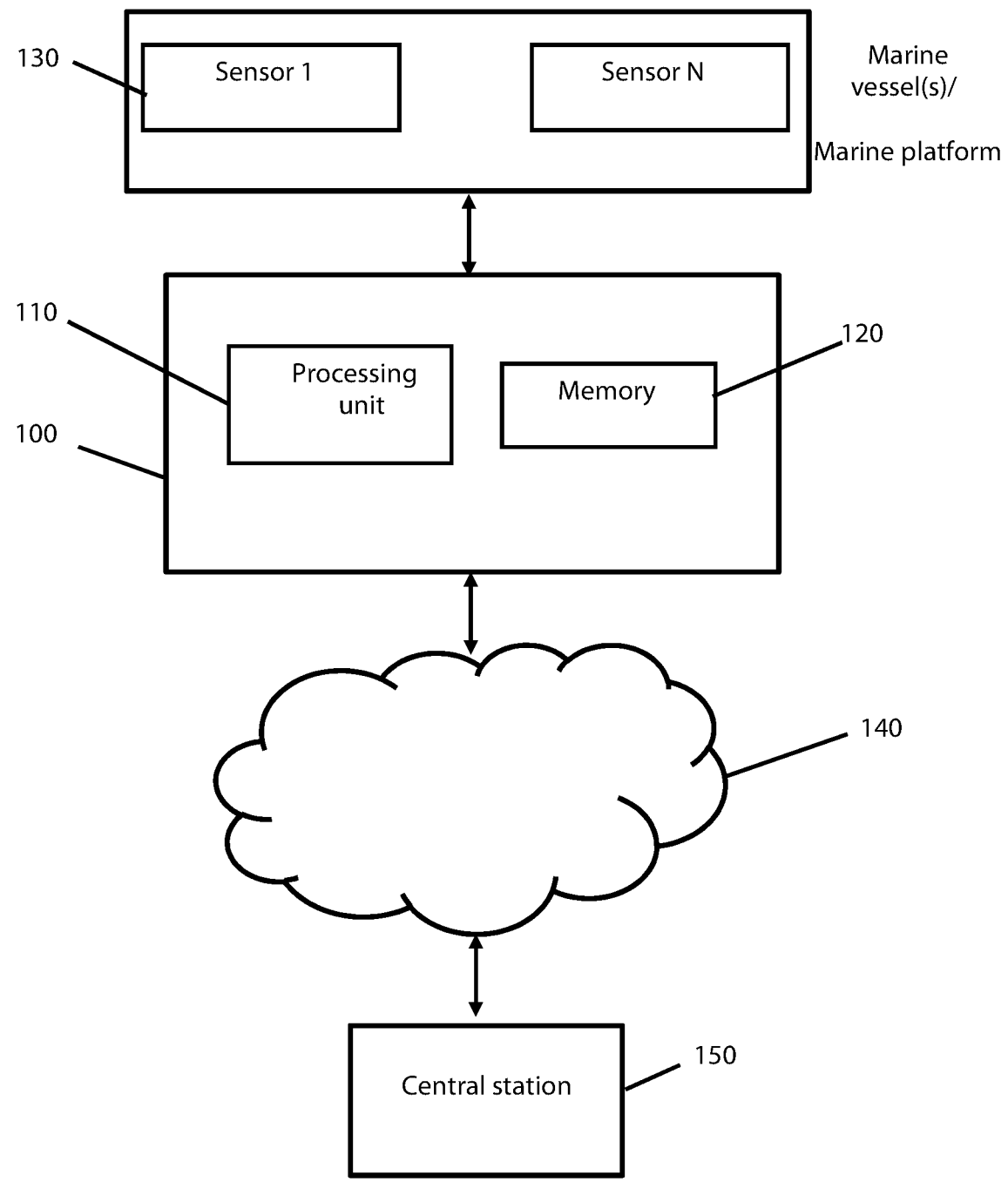
FIG. 1 illustrates an embodiment of a system which can be used to perform one or more of the methods described hereinafter.

FIG. 1 illustrates an embodiment of a system 100 which can be used to perform one or more of the methods described hereinafter. As shown, system 100 can comprise a processing unit 110 and a memory 120 (e.g. non-transitory memory).

System 100 can be embedded on a marine platform. In particular, the marine platform can be a moving marine platform. The moving marine platform can be e.g. a marine vessel. Marine vessels include e.g. ships, boats, hovercraft, etc.

In some embodiments, system 100 can be embedded on a marine platform which can be stationary.

Although embodiments will be described with reference to marine vessels, it is to be understood that these embodiments apply similarly to a stationary marine platform.

As shown in FIG. 1, system 100 can obtain data from one or more sensors 130. At least some of the sensors 130 can be located on the marine vessel on which system 100 is located (or on at least one other marine vessel communicating with the marine vessel on which system 100 is located).

Sensors 130 collect data during the voyage of the marine vessel. The voyage include of course portions of the voyage in which the marine vessel is in motion, but can also include portions of the voyage in which the marine vessel is substantially static (e.g. when the marine vessel is moored or docked such as at a harbor).

Sensors 130 can include (this list is not limitative): camera, radar, geo-localization system (e.g. GPS), automatic identification system (AIS), inertial sensor (speed or acceleration sensor), temperature sensor, pressure sensor, wind sensor, etc.

As explained hereinafter in the specification, system 100 can process data collected by sensors 130. At least part of the data can be stored in memory 120, and can be transmitted using a remote communication link.

In particular, data output by system 100 can be transmitted according to some embodiments through a remote communication network 140 towards e.g. a central station 150.

The remote communication link can correspond e.g. to a broadband cellular network (e.g. 4G, 5G, LTE, etc.), a satellite communication network, Radio communication network (such as Radio VHF—very high frequency), etc.

Data can be transmitted using a communication system located on the marine vessel which is suitable to transmit data via the remote communication network. The communication system can include e.g. an antenna, an emitter, a transponder, etc.

The central station 150 can comprise one or more database for storing data which have been transmitted from the marine vessel. As explained hereinafter, data transmitted to the central station 150 can be further used to train one or more machine learning algorithms (which can include one or more deep learning algorithms).

Figure 2:
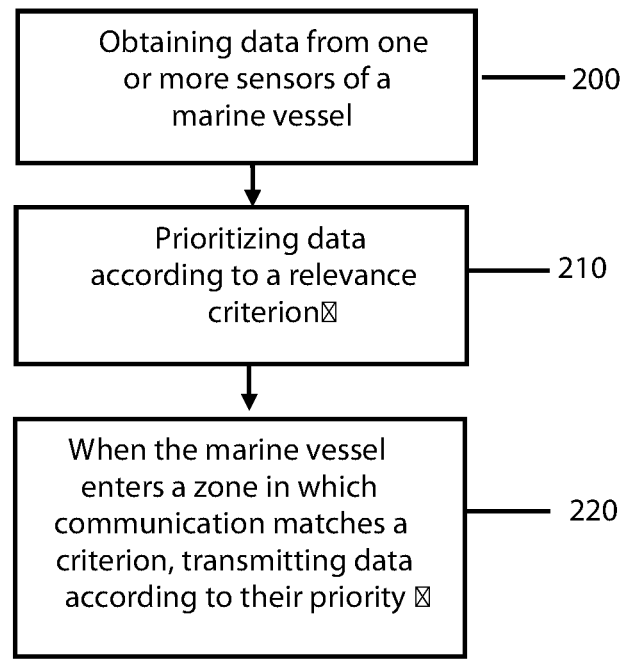
FIG. 2 illustrates an embodiment of a method which can be used to collect data and transmit such data according to its relevance.

Attention is now drawn to FIG. 2.

A method can comprise (operation 200) obtaining data collected by one or more sensors (see reference 130 in FIG. 1) of at least one marine vessel. Data are representative of one or more situations encountered by the marine vessel during its voyage. For example, if the sensor is a camera, the data can comprise a large amount of images taken by the camera during the voyage of the marine vessel.

The expression "situation" is to be construed in a broad way and include e.g. various objects (e.g. icebergs, other marine vessels, etc.) that can be encountered by the marine vessel, and/or world state (e.g. climatic conditions, state of the sea, etc.)

The expression "voyage" includes both time periods in which the marine vessel is travelling, and time periods in which the marine vessel can be moored or docked.

As explained hereinafter, data are collected in particular for training one or more machine learning algorithms (which can include e.g. one or more deep learning algorithms) which can be used to provide output in the marine environment based on data collected by sensors of marine vessels.

The output can comprise e.g. detection of obstacles (e.g. other marine vessels, icebergs, etc.), recognition of obstacles, detection of potential collision, estimation of distance to objects, alert raising (with level of severity), assistance for navigation, filtering of interesting objects, etc.

Collection and transmission of data (required for training/evaluating a machine learning algorithm) in the marine environment is however challenging since huge amounts are collected by the sensors, and remote communication data is difficult at sea.

The method can comprise (operation 210) prioritizing data according to at least one relevance criterion. Various examples of the relevance criterion will be provided hereinafter.

In other words, data obtained by the system 100 from the sensors 130 can be assigned a priority which depends on the relevance of the data. The higher the relevance, the higher the priority of the data. The lower the relevance, the lower the priority of the data.

Prioritization of data can be performed e.g. by tagging data with a marker, or with a label, or by storing data in a table or a data structure in a manner which reflects priority of data (for example the first lines or columns correspond to the data with higher priority and the last lines or columns to the lower priority—this is not limitative). These examples are not limitative.

Therefore, data collected from sensors 130 can be stored in a database (e.g. in memory 120, or in another memory located on the marine vessel), together with priority assigned to data.

Priority can be e.g. assigned using a scale or a rate (wherein one extremity of the scale corresponds to lowest priority, and another extremity of the scale corresponds to highest priority). The scale or the rate can be represented using any adapted values. This is however not limitative and priority can be represented using a textual representation (e.g. "high", "medium", "low") or any other adapted representation.

Priority can be assigned (based on the relevance criterion) e.g. by periods of time, for example, from time $t_0$ to $t_1$, a priority $P_1$ is assigned, from time $t_2$ to $t_3$, a priority $P_2$ is assigned, etc.

Operation 210 can be performed before the data are stored in the database (for example in real time or quasi real time), and/or can be performed once the data are stored in a database, using post-processing.

According to some embodiments, if data are received from a plurality of different sensors 130, prioritization can be performed separately for each type of data. For example, data acquired by a camera are prioritized separately, data acquired by an AIS are prioritized between them, and data acquired by a radar are prioritized separately. As explained hereinafter, prioritization can be influenced by data collected by a multiplicity of sensors.

According to some embodiments, if data are received from a plurality of different sensors 130, a prioritization can be performed between data of the sensors. For example, if data received from sensor 1 and data received from sensor 2 are both considered as having high priority, it can be defined that data from sensor 1 will have a higher priority relatively to data from sensor 2 because data from sensor 1 are considered as generally more relevant and useful for training one or more machine learning algorithms. This is not limitative and can be applied to a large number of sensors.

As shown in FIG. 2 (see operation 220), when then marine vessel is located in a zone in which remote data communication meets a criterion, transmission of data using at least one remote communication link can be performed. In some embodiments, data transmission is triggered as soon as possible, that it to say as soon as the marine vessel enters a zone in which remote data communication meets the criterion. According to some embodiments, the criterion can be defined as a requirement for the quality of the remote data communication, which can include at least one of:

- data representative of a minimal available transmission rate in this zone;
- data representative of a level of coverage of the zone for this communication link;
- data representative of the communication bandwidth in this zone, etc.

According to some embodiments, the criterion can also include financial/cost consideration. Indeed, some networks can provide remote data communication in the marine environment with a satisfactory quality but which involves high cost which can be incompatible with the volume of data to be transmitted. In particular, according to some embodiments, data required for training machine learning algorithms include high volume rates to be transmitted since data can include visual data such as images (which can be of high resolution) and/or videos (which can be of high resolution).

In some embodiments, a different criterion can be defined for each remote communication link. For example, broadband cellular communication is associated with a first criterion and satellite communication is associated with a second criterion.

Assessment whether remote communication data in which the marine vessel is located meets the criteria can be performed in various ways.

According to some embodiments, system 100 stores predefined data which defines for each remote communication link data representative of the quality (and if necessary cost) of the remote communication link with respect to the geographical zone. For example, for a given zone near the shore, it is stored that remote communication can be performed with a predefined minimal bandwidth.

These data can be provided e.g. by the provider of the remote communication link. System 100 monitors position of the marine vessel (using e.g. GPS, and/or AIS sensors), and can detect when the marine vessel enters (or exits) a zone in which remote communication data meets the criterion.

According to some embodiments, system 100 can comprise, or can communicate with a device which is suitable for measuring quality of the remote communication link. For example, for a broadband cellular network, an antenna of the marine vessel can be used to measure quality of reception and/or transmission of data in the zone in which the marine vessel is currently located. This measured quality can be compared to the criterion in order to trigger remote communication.

According to some embodiments, both predefined data and data measured during the voyage of the marine vessel can be used to assess whether remote communication link matches the criterion. A combination of these two types of data (e.g. an average—this is not limitative) can be performed in order to assess quality of the remote communication link in this zone. Although the method of FIG. 2 has been described with reference to a moving marine platform (marine vessel), in some embodiments, it can be applied similarly to a static marine platform. In this embodiment, operations 200 and 210 can be performed similarly. Communication of data from the marine platform can be at some periods of time more difficult (e.g. because satellite coverage is not optimal, or for some technical reasons, or because of bad climatic conditions) and therefore, when communication matches the criterion (e.g. when satellite coverage has become sufficient, or when bad climatic conditions have disappeared), the method can comprise transmitting data according to their priority (similarly to what was described for a moving marine platform). In the embodiment described in FIG. 2, transmission of data is triggered when the marine vessel enters a zone in which communication matches the criterion, whereas in this embodiment, the marine platform remains in the same zone (static marine platform) and communication is triggered when it matches the criterion.

Reverting to the example of a moving marine platform mentioned above (such as a marine vessel), when the marine vessel enters a zone for which remote data communication matches the criterion, data can be transmitted according to their priority. According to some embodiments, if a plurality of criteria have been defined, it can be set that if at least one criterion is met for at least one type of remote communication link, then data can be transmitted using this remote communication link.

According to some embodiments, transmission of data according to their priority can include transmitting data in a (temporal) order which reflects priority, e.g. first data with higher priority, and then data with lower priority.

Therefore, a priority queue can be created, wherein the data with higher priority are located at the top of the priority queue, and transmitted first, whereas the data with lower priority are located at the bottom of the priority queue, and transmitted last.

According to some embodiments, transmission of data according to their priority can include:
 most data which are transmitted first belong to the high priority data;
 a (in particular small) percentage of data which are transmitted first belong to the low priority data.

In other words, this allows transmitting first high data mixed up with a few portions of low priority data.

According to some embodiments, transmission of data according to their priority can comprise allocating a bandwidth to the data which reflects priority, e.g. high bandwidth to data with high priority and low bandwidth to data with low priority.

The amount of data which is transmitted (relatively to the entire subset of data which has been collected) depends in particular on the size of the temporal window for which the marine vessel is located in a zone in which remote communication data meets the criterion.

Assume the marine vessel exits a first zone in which a first remote communication link met the criterion, and enters a second zone.

If, in the second zone, the first remote communication link still meets the criterion, then data communication is pursued as initiated.

If, in the second zone, a second remote communication link (different from the first one) meets the criterion, then data can be transmitted using this second remote communication link. Data communication using the first remote communication link is stopped and is resumed using the second communication link. This can be viewed as a kind of handover.

If no remote communication link meets the criterion in the second zone, then remote data communication is stopped.

Remote data communication will resume when the marine vessel returns in a zone in which a remote communication link meets the criterion. Communication will resume from the latest data in the priority queue which were not transmitted, except if, in the meantime, additional data are collected which have a higher priority than this latest data (and therefore this additional data will be transmitted first when remote communication resumes).

Figure 3:
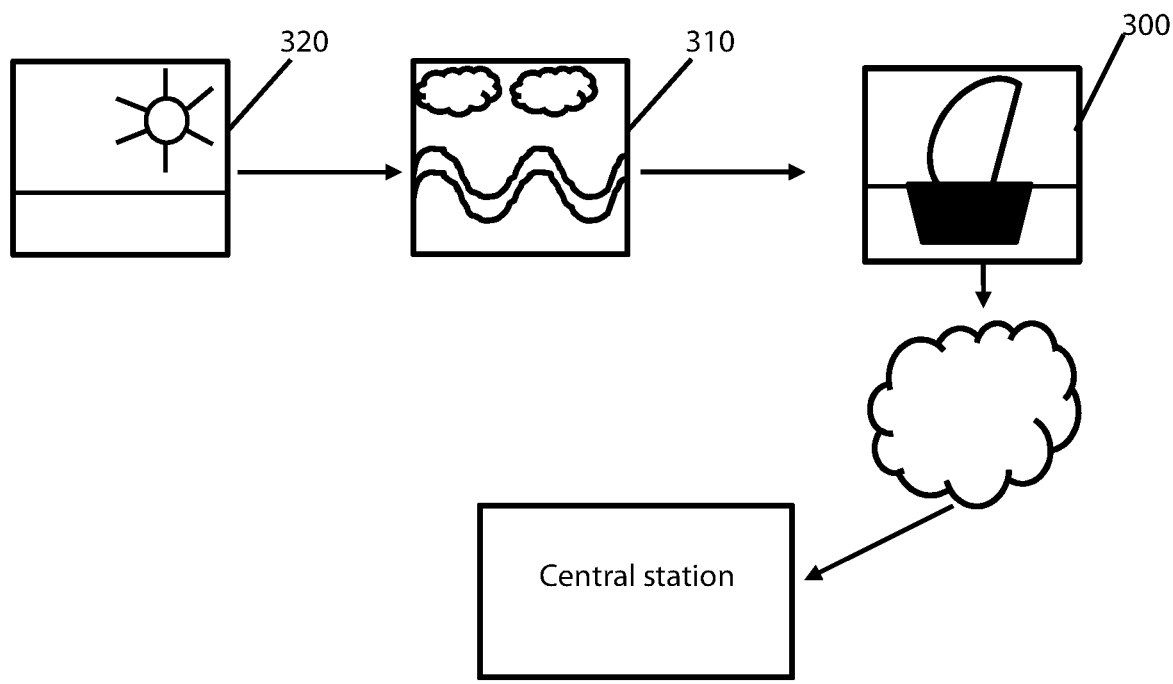
FIG. 3 illustrates an example of prioritizing data in a priority queue according to its relevance.

A priority queue is illustrated in the non-limitative example of FIG. 3.

As shown, image 300 has the highest priority and is transmitted first using the remote communication link to a central station.

Image 310 has medium priority rank, and is located after image 300 in the priority queue. Therefore, image 310 is transmitted (if the temporal window in which remote communication is large enough) after image 300. Lastly, image 320 is transmitted (if the temporal window in which remote communication is large enough).

According to some embodiments, transmission of data and collection of data can be simultaneous over one or more periods of time.

Assume the marine vessel is located in a zone in which remote communication data meets a criterion. While data which were already acquired can be transmitted using the remote communication link, additional data can be acquired and prioritized. In this case, the additional data will be inserted in the priority queue according to their priority rank, and data will be transmitted according to this priority queue. Therefore, there is an overlap in time between the process of transmitting data and the process of collecting additional data and prioritizing them.

According to some embodiments, assume a priority queue has been determined, and that according to the priority queue, given data of medium priority needs now to be transmitted. Since the process is dynamic, if the method determines new data of high priority, then this data will be inserted in the priority queue before the given data of medium priority, and therefore will be transmitted first, although they were collected later.

Figure 4:
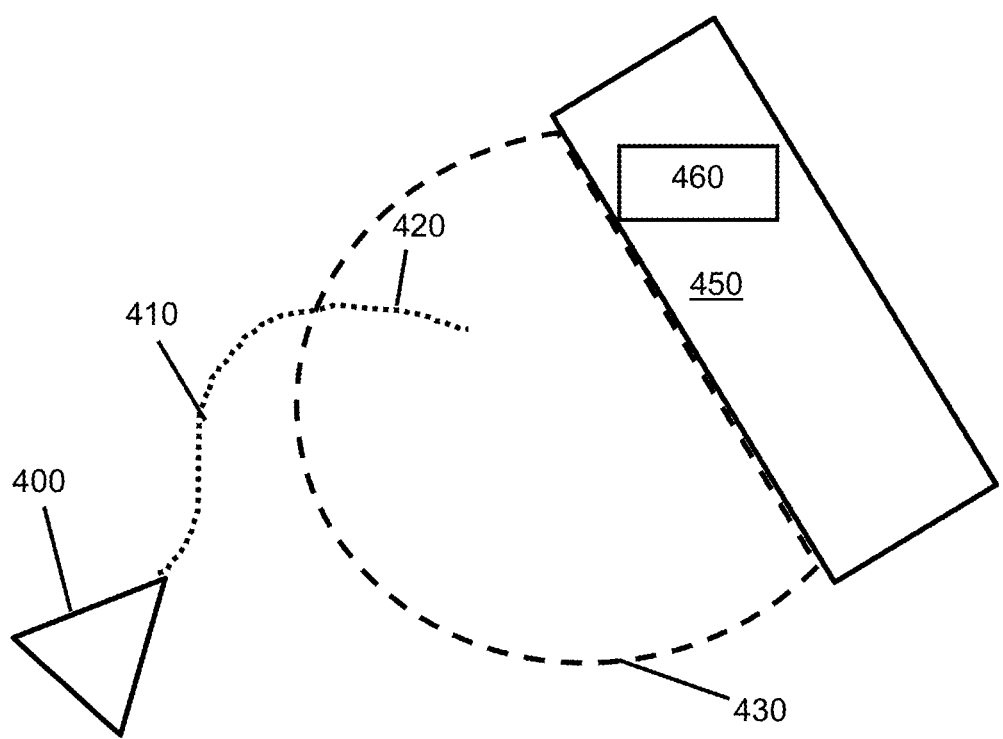
FIG. 4 illustrates an example of a voyage of a marine vessel.

Attention is drawn to FIG. 4, which illustrates a non-limitative example of a voyage of a marine vessel 400.

When the marine vessel 400 is located on portion 410 of its route 420, system 100 collects data from sensors and prioritizes them. However, data is not transmitted since the marine vessel is not located in a zone 430 in which remote communication link meets the criterion. When the marine vessel 400 enters zone 430, data can be transmitted towards the central station 460 according to their priority, using the remote communication link which is available in zone 430.

In this example, zone 430 is located in the vicinity of the shore 450. This is however not mandatory. This kind of configuration is met in particular when a broadband cellular network is used to transmit data, since quality of the communication is better when the marine vessel is close to the shore.

According to some embodiments, the solution takes advantage of the time in which the marine vessel is located outside of a zone in which remote communication data is possible in order to process data collected from sensors (this processing comprises in particular prioritizing data, but can comprise other processing that could be needed, such as filtering, etc.). When the marine vessel enters the zone in which remote communication becomes possible, data is ready to be transmitted according to the expected order.

According to some embodiments, time allocated for prioritization of data is mainly located in periods of time in which the marine vessel is not located in a zone in which remote communication data is possible. In these periods of time, processing resources of system 100 can be dedicated more to these prioritization tasks, since the task of transmitting data is not performed.

However, as mentioned above, prioritization of data can also be performed when the marine vessel is located in a communication zone, since additional data can be also collected during this period of time.

As mentioned above, data can be prioritized according to one or more relevance criteria.

In particular, according to some embodiments, the relevance criterion can reflect a relevance of the data for training one or more machine learning algorithms based on these marine data. As explained hereinafter, one or more machine learning algorithms can be trained based on this maritime data in order to perform various tasks, such as detecting of objects, alerting, predicting, outputting help for navigation, etc.

When training a machine learning algorithm, it is recommended to feed a large amount of data, which represent a large variety of different scenarios.

For example, assume the machine learning algorithm is trained to detect objects. An example of objects includes e.g. other marine vessels. The more data representative of marine vessels are fed to the machine learning algorithm (in particular data comprising a large variety of marine vessels), the better the prospects that the machine learning algorithm will be able to detect marine vessels.

For example, it is better to feed different images of a marine vessel with different angles, in different climate conditions, etc. than a single image of this marine vessel for training the machine learning algorithm.

Applicants have discovered that during the voyage of a marine vessel (this is also applicable to a static marine platform from which data are collected), only a limited fraction of the data collected by the sensors correspond to scenarios that have a certain relevance for training the machine learning algorithm.

Indeed, considering the example of images taken by a camera, then most of the images will correspond substantially to the same scene (that is to say the sky, the sea, and the sun—see image 320 in FIG. 3). Although this kind of scene is also to be fed to the machine learning algorithm (in order for it to learn the common background encountered in the sea, and therefore, this kind of scene also has some relevancy), it is not of any benefit to feed it a large number of times, since this will not improve the training of the machine learning algorithm. Therefore, these kind of images are less relevant (relative to other images) and can get a lower priority. To the contrary, if an image of another marine vessel is taken (see image 300 in FIG. 3), it is recommended to assign to this image a higher priority, since this will help in the training of the machine learning algorithm to detect this type of marine vessel.

Examples of relevance criteria are provided hereinafter.

According to some embodiments, prioritizing data according to the at least one relevance criterion is based on at least a monitoring of data representative of the route of the marine vessel. A non-limitative example is provided in FIG. 5.

Indeed, assume a planned route 520 was set for the marine vessel 500, and that at some point 510 of the voyage, the marine vessel 500 changes its route with respect to the planned route 520.

This change can be detected by a localization system (GPS, AIS, etc.), and can be indicative that from this point 510, data which are collected from the sensors correspond to a more relevant situation and therefore should get a higher priority. Indeed, a change from the planned route can indicate that the crew had to avoid an obstacle, a danger or a zone with bad weather, and therefore data collected from the sensors in the corresponding period of time have a certain relevancy and should be transmitted in priority to the central station.

For example, priority of data collected from point 510 can be considered as having a high relevancy according to the relevance criterion, and therefore can get a higher priority. This high priority can be set for data collected until a predefined period of time has elapsed, or until the marine vessel 500 has returned to its planned route 520 (according e.g. to some proximity criterion 530 defining a distance between the marine vessel 500 and the planned route 520).

According to some embodiments, prioritizing data according to the at least one relevance criterion is based on at least a monitoring of data representative of inertial data (position, speed, acceleration, etc.) of the marine vessel.

For example, if it is detected that the marine vessel has a position which is close to a harbour, this can indicate that the marine vessel attempts to reach this harbour. This kind of data can be relevant for training the machine learning algorithm, and therefore a high or medium priority can be assigned to the data collected during the corresponding period of time.

In another example, if the speed or the acceleration of the marine vessel is above (or in some cases below) a threshold, this can also indicate that the situation can be relevant for collecting data (since this can correspond to a situation which can present a risk, or which is not usual), and a higher priority can be assigned to the data collected during the corresponding period of time.

According to some embodiments, prioritizing data according to the at least one relevance criterion depends on one or more actions taken by at least one of a crew and an auto-pilot of the marine vessel for controlling the marine vessel.

Indeed, the marine vessel is generally controlled by an auto-pilot, which attempts to keep speed and course (according to some GPS waypoints). If the crew provides instruction to the auto-pilot to modify its operation (e.g. speed and/or course), this can indicate that the situation encountered by the marine is relevant and corresponding collected data should get high priority.

In some examples, if it is detected that the marine vessel received a command to change its direction, or its speed, and this change is above a predefined threshold, this can indicate that the marine vessel has encountered a situation which not usual (and/or risky) and is relevant to record. Therefore, a higher priority can be assigned to the data collected during the corresponding period of time in which these actions have been detected.

Other actions which can reflect a higher relevancy, and therefore trigger a higher priority of the collected data can include e.g. raising of an alert by the crew, entering a port, bad visibility, congested waterways, certain speeds, maneuvers, collision alert, shallow waters, etc.

According to some embodiments, prioritizing data according to the at least one relevance criterion depends on data collected by one or more weather sensors.

For example, if specific climatic conditions are detected (e.g. high winds, large quantity of rain, or more generally climatic conditions which differ from predefined standard climatic conditions reflecting usual weather, etc.), this can correspond to relevant data, and therefore a higher priority can be assigned to the data collected during the corresponding period of time.

According to some embodiments, prioritizing data according to the at least one relevance criterion depends on data collected by vibration sensors on the marine vessel.

For example, if vibration above a threshold is detected (thereby indicating an abnormal situation), this can correspond to relevant data, and therefore a higher priority can be assigned to the data collected during the corresponding period of time.

According to some embodiments, prioritizing data according to the at least one relevance criterion, depends on a detection of objects in the images taken by one or more cameras of the marine vessel. For example, if a detection algorithm detects one or more marine vessels, or specific objects (e.g. icebergs, etc.), in the images, then the data collected during this period of time (data collected by the camera, but also data from other sensors) can be considered as having a higher relevancy and therefore can be assigned with a higher priority.

In some embodiments, the detection algorithm can be a machine learning algorithm (for example which was already trained using past data collected according to the present solution) and which is used currently on the marine vessel for detecting and identifying objects in the sea based on data collected by sensors of the marine vessel.

According to some embodiments, prioritizing data according to the at least one relevance criterion depends on multiple set of rules, which can be e.g. predefined by an operator and stored in a memory (e.g. of system 100).

For example, if both a speed of the marine vessel, and a number of objects detected in the images, and climatic conditions each meet a predefined criterion, then this can correspond to relevant data and therefore a higher priority can be assigned to data collected during this period of time.

According to some embodiments, the relevance can be defined depending on data collected by various sensors of the marine vessel. In other words, data collected by various sensors can be fused to assess whether the situation in which the marine vessel is located corresponds to a relevant situation.

For example, if the velocity of the marine vessel is below a threshold, and the distance to port is less than a threshold, this indicates that the marine vessel is stationed at the port, and therefore, data which are collected will get a very low priority. This is not limitative and various other rules can be defined which depend on various data collected by various sensors.

According to some embodiments, one or more of these rules can be generated by a machine learning algorithm during the voyage of the marine vessel. The machine learning algorithm can be different from the machine learning algorithm for which data are collected and transmitted in order to train this machine learning algorithm.

The machine learning algorithm (used for generating rules) can receive as an input a set of rules (already predefined by an operator), and data from sensors, and can be trained to generate new set of rules which are adapted to the marine vessel.

For example, assume a rule is adapted to a zone in which many icebergs are present. The rule defines that data are relevant if the number of icebergs in the vicinity of the marine vessel is above a threshold.

If the marine vessel moves to another part of the sea in which icebergs are less present, the machine learning algorithm can learn that the threshold has to be changed (based on data collected by the sensors of the marine vessel), and reduced, thereby generating a new rule which is more adapted to the current situation of the marine vessel. This example is however not limitative.

According to some embodiments, prioritizing data according to the at least one relevance criterion is based on at least a comparison between collected data and data already stored in the database of the system 100. If this comparison shows that the collected data (for example images) match data already stored in the database, then it is not worth assigning these data with a high priority since they have already been collected in the past, and are redundant. This comparison can be performed using e.g. image processing.

Figure 6:
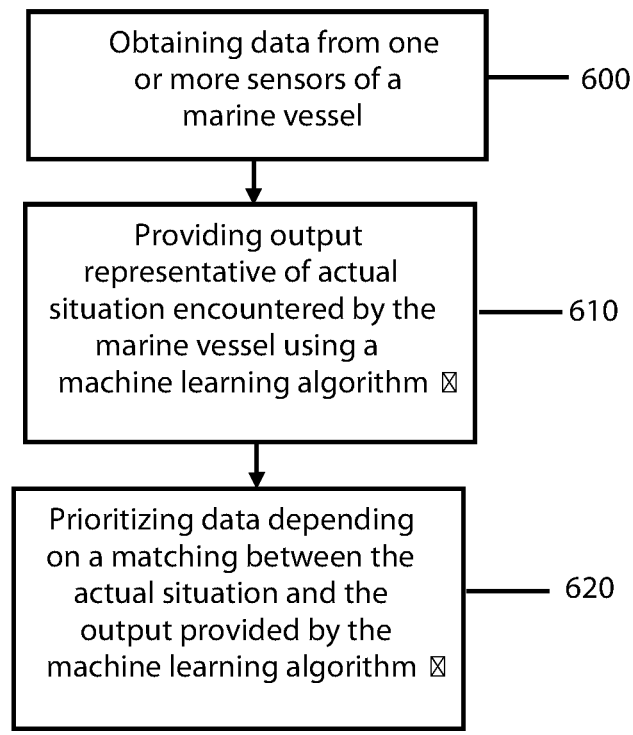
FIG. 6 illustrates an embodiment of a method of determining relevance of collected data based on the output of a machine learning algorithm currently operating on the marine vessel.

Attention is drawn to FIG. 6, which depicts another embodiment for prioritizing data according to the relevance criterion.

Assume the marine vessel embeds a system comprising a machine learning algorithm attempting to provide output representative of an actual situation encountered by the marine vessel during its voyage. The output can be e.g. a detection/identification of the objects present in the images taken by a camera of the marine vessel, based on various data collected by the sensors (camera, AIS, radar, etc.). This is however not limitative and other output can be provided (e.g. assistance to navigation for the marine vessel, etc.).

For example, this machine learning algorithm has been trained previously using data collected during previous voyages of marine vessels (according e.g. to the various methods described in the present application), and/or using simulated data. In some embodiments, the machine learning algorithm has been trained previously to detect/identify objects present in the vicinity of the marine vessel, using e.g. images from cameras, AIS data, radar data, etc.

During the voyage of the marine vessel, the machine learning algorithm provides an output (operation 610) depending on the data collected by the sensors of the marine vessel (operation 600). As mentioned above, this output should be (depending on the performance of the model) representative of the actual situation encountered by the marine vessel.

Assume an example in which a machine learning algorithm is trained to detect/identify objects. This is however not limitative and the machine learning algorithm can be trained for other purposes (e.g. alert raising, assistance to navigation, etc.).

If, in the actual situation, three other marine vessels are present in front of the marine vessel, the machine learning algorithm needs to provide an output which reflects the presence of these three other marine vessels.

A comparison between the output provided by the machine learning algorithm and the actual situation encountered by the machine vessel is representative of the level of performance of the machine learning algorithm.

This comparison can be performed using an input of an operator. For example, the machine learning algorithm can detect two vessels, and the operator will indicate to the system (using e.g. an interface of the system) the level of matching of the output with the actual situation. This level matching can be represented using various manners: for example, the operator can indicate a level of matching using a score, etc.

In other embodiments, the level of matching can be determined using data provided by sensors of the marine vessel.

For example, assume that the machine learning algorithm detected, based on the images provided by a camera, two other marine vessels. However, the AIS indicates that in fact, three marine vessels are located in the vicinity. The comparison of the output provided by the machine learning algorithm with the data provided by the AIS therefore indicates that the level of matching is not satisfactory.

According to some embodiments, prioritizing data according to the least one relevance criterion depends on a matching between the actual situation and the output provided by the system (operation 620). This level of matching can be assessed based e.g. on a matching criterion (which defines e.g. a scale for which high matching, medium matching, or low matching is obtained).

If the output is a detection of objects, then the matching can be a comparison between the detection provided by the machine learning algorithm and the actual situation.

If the output is e.g. a command for assisting the marine vessel in navigation, the matching can reflect to what extent the command output by the machine learning algorithm is really adapted to the actual situation faced by the marine vessel.

According to some embodiments, the lower the matching, the higher the relevancy, and conversely, the higher the matching, the lower the relevancy.

Indeed, if the matching is high, this means that the machine learning algorithm is already well trained for the actual situation, and therefore the collected data are not so relevant to further improve training of the machine learning algorithm. As a consequence, there is no point assigning high priority to the collected data.

To the contrary, if the matching is low, or medium, this shows that the machine learning algorithm is not well trained for this actual situation, and therefore, collected data are highly relevant and should be assigned a higher priority, in order to improve training of the machine learning algorithm for this kind of situation.

Although an example has been provided with data collected by a camera, this is not limitative and the matching between data provided by the machine learning algorithm and the actual situation as sensed by the sensor can be assessed for any of the sensors of the marine vessel, in order to determine relevance/priority of data associated to these sensors. For example, the AIS can provide position of marine vessels located in the vicinity of the marine vessel, and the machine learning algorithm can predict position of these marine vessels based on the data collected by a radar. If there is a low level of matching, this can indicate that data collected by the radar should get high priority.

Therefore, this method allows assigning priority of data using an actual version of the machine learning algorithm, thereby allowing online and up-to-date understanding of the relevance of the data.

If the machine learning algorithm is trained to provide other output, such as alert raising, or assistance to navigation, the method can be performed in a similar way. When the machine learning algorithm embedded on the marine vessel provides its output based on the collected data, an operator can input to the system a level of matching of the output with the current situation (or a level of performance of the output with respect to the actual situation). For example, if the machine learning algorithm provides instructions or commands or recommendation for assisting in navigation (e.g. inertial commands, such as direction or speed), and an operator understands that these commands are adapted to the actual situation, then the operator can provide that the matching is high, and, if not, that the matching is low. The higher the matching, the lower the relevancy, and the lower the priority. The lower the matching, the higher the relevancy, and the higher the priority.

In some embodiments, a processor (e.g. of system 100) can detect the level of matching. For example, the processor can be connected to the marine vessel's helm, or and/or another actuator of the marine vessel, and/or to the autopilot, and can detect what action was taken with respect to the recommendation (or more generally the output) provided by system 100, and the error rate (difference between the recommendation and the actual action taken by the crew). This indicates to what extent the recommendation provided by system 100 matches the actual situation.

The higher the matching, the lower the relevancy, and the lower the priority. The lower the matching, the higher the relevancy, and the higher the priority.

Figure 6A:
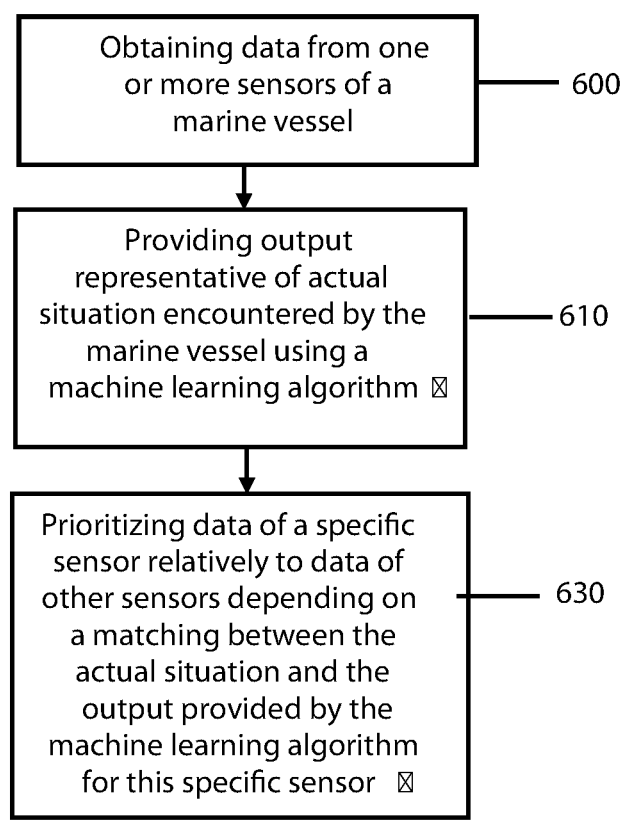
FIG. 6A illustrates an embodiment of a method of determining relevance of collected data based on the output of a machine learning algorithm currently operating on the marine vessel, and transmitting data based on this relevance.

In some embodiments (see FIG. 6A), data collected by one or more specific sensors can be prioritized relatively to data collected by other sensors.

The method comprises operations 610 and 620 as described above. Assume that for a specific sensor out of the sensors 130, an output representative of an actual situation encountered by the marine vessel using the machine learning algorithm differs from the actual situation. The method can comprise (operation 630) assigning a higher priority to data collected by this specific sensor, whereas data collected by the other sensors can also get high priority but less than for this specific sensor.

For example, assume there is a bad weather, and therefore, low visibility. Assume the AIS provided that there are three boats in front of the marine vessel, and that the machine learning algorithm detected based on the data provided by the camera only one boat. The method can comprise assigning a high priority to the data collected by all sensors (because the situation corresponds to a relevant situation since the machine learning algorithm was not able to provide correct detection), but the priority assigned to the data collected by the camera will get higher priority than all the other sensors, because it appears that the machine learning algorithm needs to be improved specifically for data collected by this sensor.

Therefore, prioritization specific to data collected for each sensor can be performed, based e.g. on online performance obtained for data collected for this sensor.

Figure 7:
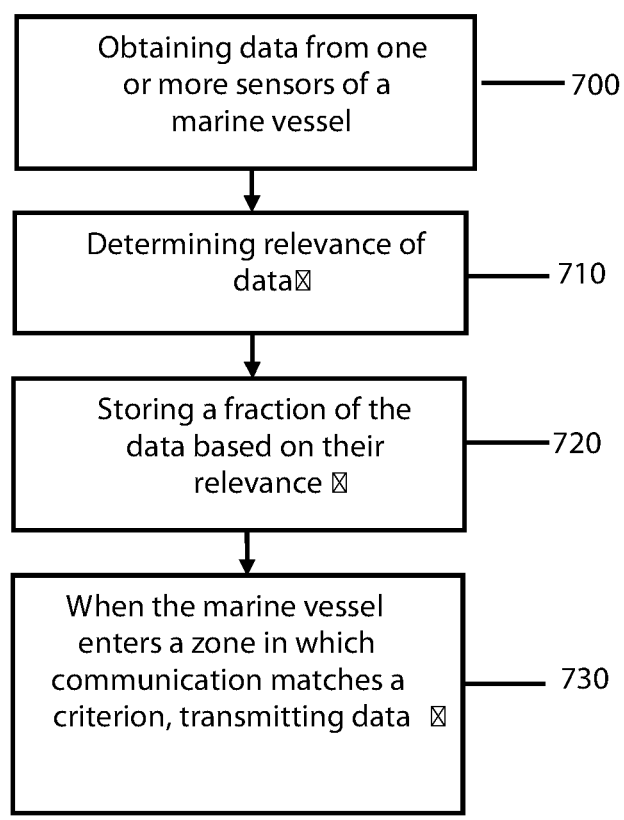
FIG. 7 illustrates an embodiment of a method of reducing size of collected data, for their storage before their transmission.

Attention is now drawn to FIG. 7.

The method can comprise (operation 700) obtaining data collected by one or more sensors (see reference 130 in FIG. 1) of at least one marine vessel during its voyage (it has to be noted that the method of FIG. 7 can be applied to a static marine platform).

Operation 700 is similar to operation 200 and is not described again.

The method can comprise (operation 710) determining relevance of data according to at least one relevance criterion.

In particular, the relevance criterion can be defined to determine a relevance of the data for training a machine learning algorithm which provides an output based on these data (e.g. detection, recognition of objects, alerting, etc.).

Figure 5:
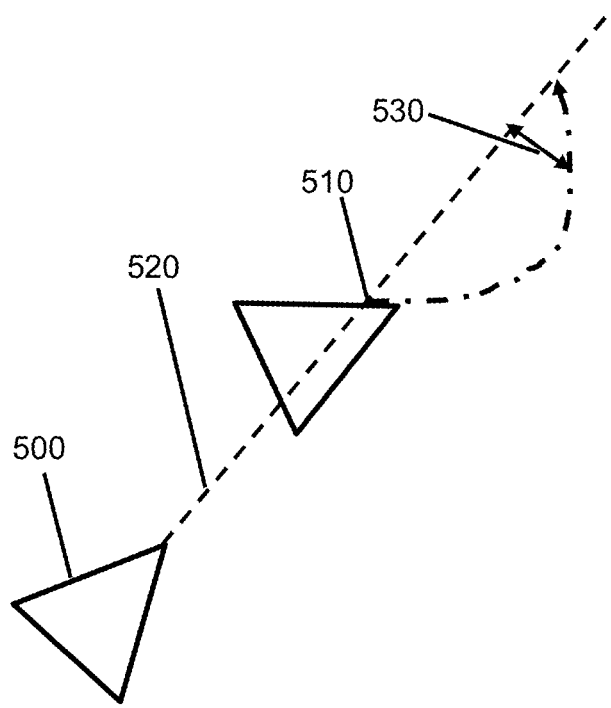
FIG. 5 illustrates an example of a method of determining relevance of collected data.

Several embodiments have been described above for assessing relevancy of data based on the relevance criterion and can be used in the present method (see e.g. FIG. 4 to FIG. 6). Therefore, these embodiments are not described again.

For example, when the marine vessel changes its route from a predefined route, a higher relevance can be assigned.

Operation 710 is similar to operation 210 and is not described again.

The method can comprise storing, in a memory, a fraction of the data obtained from the sensors (and not all obtained data) during a period of time.

The selection of the fraction of the obtained data relatively to the obtained data can be performed based on the relevance determined for the obtained data.

Assume data are obtained during a period of time. Assume it is determined based on the relevance criterion that these data are not so relevant (low relevance). Therefore, the fraction of the obtained data which is stored in a database (in particular for their subsequent transmission) will be low.

To the contrary, assume it is determined based on the relevance criterion that data obtained during a period of time are highly relevant. Therefore, the fraction of the obtained data (relatively to the obtained data) which is stored (in particular for their subsequent transmission) in this period of time will be high (and can be up to one, that it to say that all obtained data during this period of time will be stored in a database).

In other words, the higher the relevance of the obtained data, the higher the fraction of obtained data which is stored, and the lower the relevance of the obtained data, the lower the fraction of obtained data which is stored.

This can be illustrated in a simple example (which is not limitative).

Assume images are recorded by a camera of the marine vessel.

For example, the camera records 30 frames per second.

Assume that during a given period of time, data are considered as not very relevant based on the relevance criterion (for example, the camera records images which comprise only the sea and the sky in standard climatic conditions).

Therefore, it is not worth storing all data obtained by the camera during this given period of time, and it can be decided that only a fraction of the obtained data is stored in a memory of the system 100. For example, if the relevancy is very low, only one frame per hour can be stored. This is however not limitative.

If the relevance is very low, for example when it is detected that the marine vessel is located at the port (see above embodiments for detecting this position), then in some embodiments data collected from sensors are not stored at all by system 100.

In some embodiments, all data collected from the sensors are stored, and the system 100 comprises a layer (query layer) which stores only fraction of data as explained with respect to FIG. 7.

Assume that during a given period of time, data are considered as very relevant based on the relevance criterion.

Therefore, it is worth storing most or all data obtained by the camera during this given period of time, and it can be decided that most or all the data collected by the camera is stored in a memory of the system 100. For example, if the relevance is very high, all frames (at the rate of 30 frames per second) obtained by the camera can be stored. This is however not limitative.

Over a plurality of periods of time, the method will thus store only a fraction of the obtained data (because as already mentioned above, most of the data obtained from the sensors correspond to situations which are not relevant for improving the training of the machine leaning algorithm). During some periods of time, all obtained data will be stored, and during other periods of time, only a small fraction of the obtained data will be stored.

As shown in FIG. 7 (see operation 730), when the marine vessel is located in a zone in which remote data communication meets a criterion, transmission of stored data using at least one remote communication link can be performed (if the method is used for a static marine platform, then data is transmitted when remote data communication meets a criterion).

Examples of criteria have been provided in the previous embodiments above and apply herein.

In some embodiments, since selection of a fraction of the data has already allowed a reduction of the size of the data to be transmitted, then data are transmitted without taking into account relevance of data. This is shown in operation 730 in FIG. 7.

For example, a mechanism such as first in, first out, can be used, or data to be transmitted among the stored data can be selected randomly. This is however not limitative.

In other embodiments, data which are stored (which correspond to the fraction of the obtained data) are transmitted according to their relevance. This is shown in operation 740 in FIG. 7A.

This operation is equivalent to operation 220 described in FIG. 2. The main difference is that in the embodiment of FIG. 7A, obtained data have first been reduced by selecting only a fraction of them based on their relevance.

The more the data are relevant, the higher their priority in the priority queue in which data are transmitted.

The less the data are relevant, the lower their priority in the priority queue in which data are transmitted.

Various embodiments have been described above for transmitting data according to their relevance, and apply herein.

Figure 7A:
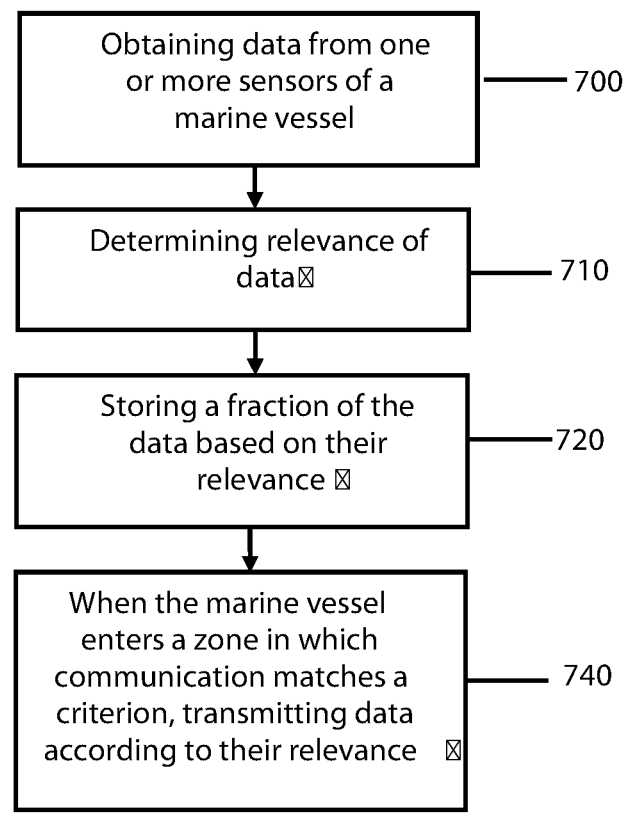
FIG. 7A illustrates an embodiment of a method of reducing size of collected data for its storage before transmission, and transmitting the data according to its relevance.

According to some embodiments, the method of FIG. 7A can be applied to a stationary marine platform (in operation 740, data will be transmitted when communication meets a criterion).

Figure 7B:
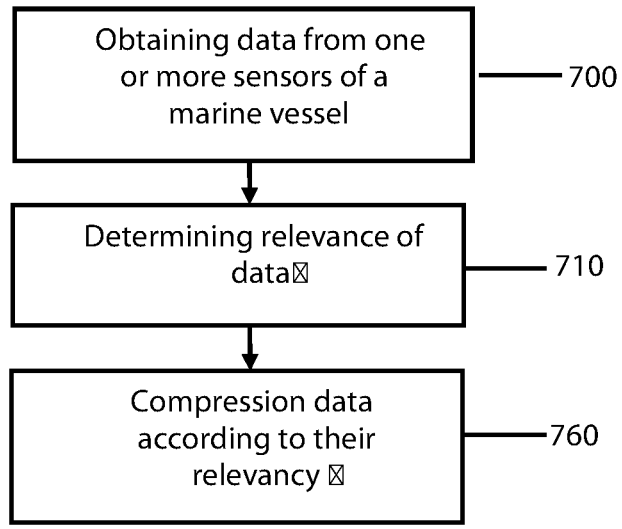
FIG. 7B illustrates an embodiment of a method of compressing data according to their relevance.

Attention is drawn to FIG. 7B, which describes a method of processing data according to their relevance.

The method comprises (operation 700) in which data are obtained from one or more sensors of a marine vessel (this operation has already been described with respect to FIGS. 7 and 7A).

The method comprises (operation 710) determining relevance of data according to at least one relevance criterion (this operation has already been described with respect to FIGS. 7 and 7A).

The method can comprise compressing (operation 760) data according to their relevance. For example, data with low relevance will be compressed with a high compression rate (even if quality of data is reduced), whereas data with high relevance will not be compressed or with a lower compression rate (thereby preserving quality of data).

This method can be combined with the various methods already described above. For example, if this method is combined with the method of FIG. 2, data will be prioritized according to their relevance and transmitted according this prioritization. Low priority data (which have been highly compressed according to the method of FIG. 7B) will be transmitted last, whereas high priority data (which have not been compressed, or with a low compression rate), will be transmitted first.

If this method is combined with the method of FIG. 7, then only a fraction of the data is stored, depending on their relevance, and among this fraction of data, compression is performed according to the relevance as explained in FIG. 7B.

The same applies to the combination of the method of FIG. 7B with the method of FIG. 7A.

Figure 8:
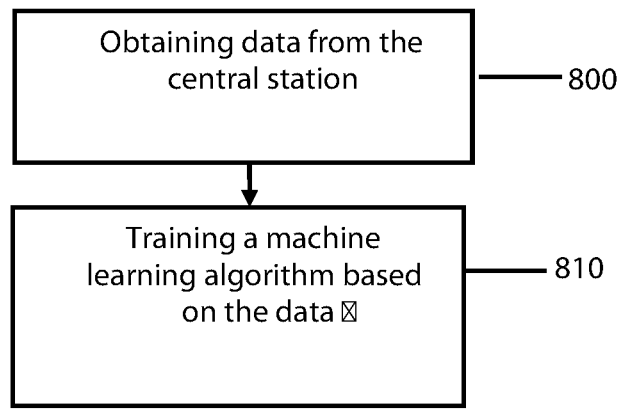
FIG. 8 illustrates an embodiment of training a machine learning algorithm based on the collected data.

Attention is now drawn to FIG. 8 which describes a method of using the data transmitted using the various embodiments described above.

As described above, data collected by sensors and representative of various situations encountered by the marine vessel are transmitted to a central station. In some embodiments, a plurality of marine vessels are used, and therefore, data are collected from a plurality of marine vessels.

Based on these data, a machine learning algorithm (or a plurality) can be trained (see operations 800, 810). The machine learning algorithm can include e.g. a deep learning algorithm (or a plurality).

According to some embodiments, a supervised learning can be used. Depending on the output which is expected from the machine learning algorithm, a different supervised learning can be used.

For example, in some embodiments, detection and/or identification of objects and/or situations is to performed by the machine learning algorithm. This is not limitative and other output can be computed based on these data (alerting, output for assisting the crew in navigation, etc.).

In this case, an operator can annotate the data transmitted to the central station. Examples of annotations include e.g. type of objects (type of marine vessel, iceberg, maritime creatures, etc.)

As mentioned above, since data can be sent according to their relevance, and/or can be stored according to their relevance, labelling effort is reduced and supervision of incoming data is optimized.

The machine learning algorithm can be trained based on these data and on the annotations provided by the operator.

After training, the machine learning algorithm can be deployed on a marine vessel, in order to test its performance.

For example, the method of FIG. 6 can be performed, as explained above.

In some embodiments, the machine learning algorithm can be at least partially trained on the marine vessel.

Examples of machine learning algorithms (which can include deep learning algorithm) which can be used include e.g. Deep neural networks, Deep belief networks, Convolutional neural networks, Convolutional Deep Belief Networks, Stacked (Denoising) Auto-Encoders, Deep stacking networks, Deep Recurrent Neural Networks, Super resolution, Generative adversarial Networks, etc. This is however not limitative.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method, comprising:
   by at least one processing unit:
   obtaining data collected by one or more sensors of at least one marine vessel, said data being representative of one or more situations encountered by the marine vessel during a voyage thereof;
   prioritizing the data according to at least one relevance criterion; and
   when the marine vessel is located in a zone in which at least one remote data communication link meets a criterion, transmitting at least some of the data using the at least one remote data communication link, wherein the at least some of the data are transmitted according to priority determined for the data,
wherein prioritizing the data according to the at least one relevance criterion depends on a matching between:
one or more actual situations encountered by the marine vessel during the voyage thereof, and
one or more outputs provided by at least one machine learning algorithm, or by a system comprising said at least one machine learning algorithm, based at least on the data collected by said one or more sensors, the one or more outputs being representative of the one or more actual situations encountered by the marine vessel during the voyage thereof.

2. The method of claim 1, wherein the relevance criterion reflects at least one of:
(i) a relevance of the data for training one or more given machine learning algorithms based on these data, the one or more given machine learning algorithms comprising the at least one machine learning algorithm, or being different from the at least one machine learning algorithm; or
(ii) a severity of a situation or an event encountered by the marine vessel during the voyage thereof.

3. The method of claim 1, wherein at least one of (i) or (ii) is met:
(i) prioritizing the data according to the at least one relevance criterion depends on one or more actions taken by at least one of a crew or an auto-pilot of the marine vessel for controlling the marine vessel; or
(ii) prioritizing the data according to the at least one relevance criterion is based on at least a monitoring of data representative of at least one of a route or of inertial data of the marine vessel.

4. The method of claim 1, wherein when the marine vessel enters a zone in which remote data communication using at least one remote communication network meets a criterion, the method comprises transmitting at least some of the data over the remote communication network, wherein the at least some of the data are transmitted according to the priority determined for the data.

5. The method of claim 1, further comprising selecting a fraction of the obtained data for storing said fraction of obtained data before their transmission, wherein, for each period of time of a plurality of periods of time, a selection of the fraction of obtained data relative to the obtained data depends on priority determined for the obtained data associated with said period of time.

6. The method of claim 1, wherein the marine vessel embeds, or communicates with, the system comprising the at least one machine learning algorithm.

7. The method of claim 6, wherein the lower the matching between the one or more actual situations and the one or more outputs provided by the at least one machine learning algorithm, or by the system comprising the at least one machine learning algorithm, the higher the priority assigned to collected data representative of the one or more actual situations.

8. The method of claim 1, further comprising training at least one given machine learning algorithm based on the transmitted data, the at least one given machine learning algorithm corresponding to said at least one machine learning algorithm, or being different from the at least one machine learning algorithm.

9. A system, comprising:
at least one processing unit configured to:
obtain data collected by one or more sensors of at least one marine vessel, said data being representative of one or more situations encountered by the marine vessel during a voyage thereof;
prioritize the data according to at least one relevance criterion; and
when the marine vessel is located in a zone in which at least one remote data communication link meets a criterion, trigger transmission of at least some of the data using the at least one remote data communication link, wherein the at least some of the data are transmitted according to priority determined for the data,
wherein prioritizing the data according to the at least one relevance criterion depends on a matching between:
one or more actual situations encountered by the marine vessel during the voyage thereof, and
one or more outputs provided by at least one machine learning algorithm, or by a second system comprising at least one machine learning algorithm, based at least on the data collected by said one or more sensors, the one or more outputs being representative of the one or more actual situations encountered by the marine vessel during the voyage thereof.

10. The system of claim 9, wherein the relevance criterion reflects at least one of:
(i) a relevance of the data for training one or more given machine learning algorithms based on these data, the one or more given machine learning algorithms comprising the at least one machine learning algorithm, or being different from the at least one machine learning algorithm; or
(ii) a severity of a situation or an event encountered by the marine vessel during the voyage thereof.

11. The system of claim 9, wherein prioritizing the data according to the at least one relevance criterion depends on one or more actions taken by at least one of a crew or an auto-pilot of the marine vessel for controlling the marine vessel.

12. The system of claim 9, wherein prioritizing the data according to the at least one relevance criterion is based on at least a monitoring of data representative of at least one of a route or of inertial data of the marine vessel.

13. The system of claim 9, wherein when the marine vessel enters a zone in which remote data communication using at least one remote communication network meets a criterion, the system is configured to trigger transmission of at least some of the data over the remote communication network, wherein the at least some of the data are transmitted according to the priority determined for the data.

14. The system of claim 9, configured to select a fraction of the obtained data for storing said fraction of obtained data before their transmission, wherein, for each period of time of a plurality of periods of time, selection of the fraction of obtained data relative to the obtained data depends on priority determined for the obtained data associated with said period of time.

15. The system of claim 9, wherein the system or the marine vessel;
embeds, or communicates with, the second system comprising the at least one machine learning algorithm.

16. The system of claim 15, wherein the lower the matching between the one or more actual situations and the one or more outputs provided by the at least one machine learning algorithm, or by the second system, the higher the priority assigned to collected data representative of the one or more actual situations.

17. The system of claim 15, wherein prioritizing the data according to the least one relevance criterion for a specific sensor relative to data collected by other sensors depends on a matching between the one or more actual situations and the one or more outputs provided by the at least one machine learning algorithm, or by the second system for this specific sensor.

18. The system of claim 9, wherein relevance of data defined by the relevance criterion depends on one or more outputs of a plurality of different sensors of the marine vessel.

19. The system of claim 9, wherein at least one of (i), (ii), (iii), (iv) or (v) is met:
(i) the at least one machine learning model, or the second system comprising the at least one machine learning model, is usable to detect objects around the marine vessel;
(ii) the at least one machine learning model, or the second system comprising the at least one machine learning model, is usable to assist navigation of the marine vessel;
(iii) the at least one machine learning model, or the second system comprising the at least one machine learning model, is usable to estimate distance to objects around the marine vessel;
(iv) the at least one machine learning model, or the second system comprising the at least one machine learning model, is usable to recognize objects around the marine vessel;
(v) the at least one machine learning model, or the second system comprising the at least one machine learning model, is usable to detect a potential collision between the marine vessel and one or more objects.

20. A non-transitory computer readable medium including instructions that, when executed by one or more processing circuitries, cause the one or more processing circuitries to perform a method comprising:
obtaining data collected by one or more sensors of at least one marine vessel, said data being representative of one or more situations encountered by the marine vessel during a voyage thereof;
prioritizing data according to at least one relevance criterion; and
when the marine vessel is located in a zone in which at least one remote data communication link meets a criterion, transmitting at least some of the data using the at least one remote data communication link, wherein the at least some of the data are transmitted according to priority determined for the data,
wherein prioritizing the data according to the at least one relevance criterion depends on a matching between:
one or more actual situations encountered by the marine vessel during the voyage thereof, and
one or more outputs provided by at least one machine learning algorithm, or by a system comprising said at least one machine learning algorithm, based at least on the data collected by said one or more sensors, the one or more outputs being representative of the one or more actual situations encountered by the marine vessel during the voyage thereof.

* * * * *